US012621762B2

(12) United States Patent
Au

(10) Patent No.: US 12,621,762 B2
(45) Date of Patent: May 5, 2026

(54) SERVING CELL PLANNING TOOL

(71) Applicant: T-MOBILE INNOVATIONS LLC,
Overland Park, KS (US)

(72) Inventor: Chad Chun Fai Au, Kirkland, WA
(US)

(73) Assignee: T-MOBILE INNOVATIONS LLC,
Overland Park, KS (US)

( * ) Notice: Subject to any disclaimer, the term of this
patent is extended or adjusted under 35
U.S.C. 154(b) by 343 days.

(21) Appl. No.: 18/391,873

(22) Filed: Dec. 21, 2023

(65) Prior Publication Data

US 2025/0212107 A1      Jun. 26, 2025

(51) Int. Cl.
H04W 48/12      (2009.01)
H04W 48/16      (2009.01)
H04W 48/18      (2009.01)
H04W 48/20      (2009.01)
H04W 64/00      (2009.01)
H04W 88/06      (2009.01)

(52) U.S. Cl.
CPC ........... H04W 48/20 (2013.01); H04W 64/00
(2013.01)

(58) Field of Classification Search
CPC ...... H04W 48/20; H04W 24/02; H04W 64/00
USPC ....................................................... 455/434
See application file for complete search history.

(56) References Cited

U.S. PATENT DOCUMENTS

| | | | | |
|---|---|---|---|---|
| 11,019,563 B1 * | 5/2021 | Sevindik | ............... | H04W 48/16 |
| 11,064,389 B1 * | 7/2021 | Sevindik | ............... | H04W 80/02 |
| 2012/0106346 A1 * | 5/2012 | Aguirre | ............ | H04W 28/0967 |
| | | | | 370/237 |
| 2019/0181940 A1 * | 6/2019 | Liang | .................... | H04W 16/28 |
| 2020/0280869 A1 * | 9/2020 | Biswas | ................ | H04W 4/027 |
| 2021/0029717 A1 * | 1/2021 | Sevindik | .......... | H04W 28/0236 |
| 2022/0022270 A1 * | 1/2022 | Sevindik | .......... | H04W 74/0875 |
| 2023/0199589 A1 * | 6/2023 | Takeda | .................. | H04W 24/02 |
| | | | | 370/331 |
| 2024/0430924 A1 * | 12/2024 | Sevindik | ............... | H04W 16/22 |

OTHER PUBLICATIONS

IP.com search History (Year: 2025).*

* cited by examiner

*Primary Examiner* — Moustapha Diaby
(74) *Attorney, Agent, or Firm* — SHOOK, HARDY &
BACON L.L.P.

(57) ABSTRACT

Systems and methods are provided for serving cell planning. Wireless high-speed internet (HSI) is becoming more popular as an alternative to traditional options due to convenience of installation, among other reasons. However, wireless HSI has some propagation challenges such as requiring a line-of-sight (LOS) with the serving cell as well as significant indoor penetration loss for radio signals operating at higher frequencies. Customer Premises Equipment (CPE) devices are developing that mitigate indoor propagation losses but, in order to be effective, it must be determined whether each application can maintain LOS with a serving cell. An installation tool that evaluates various network factors to advise on viability and installation of CPE and indicate an orientation to face the best serving cell would be a valuable tool to maximize effectiveness of the CPE.

20 Claims, 5 Drawing Sheets

100
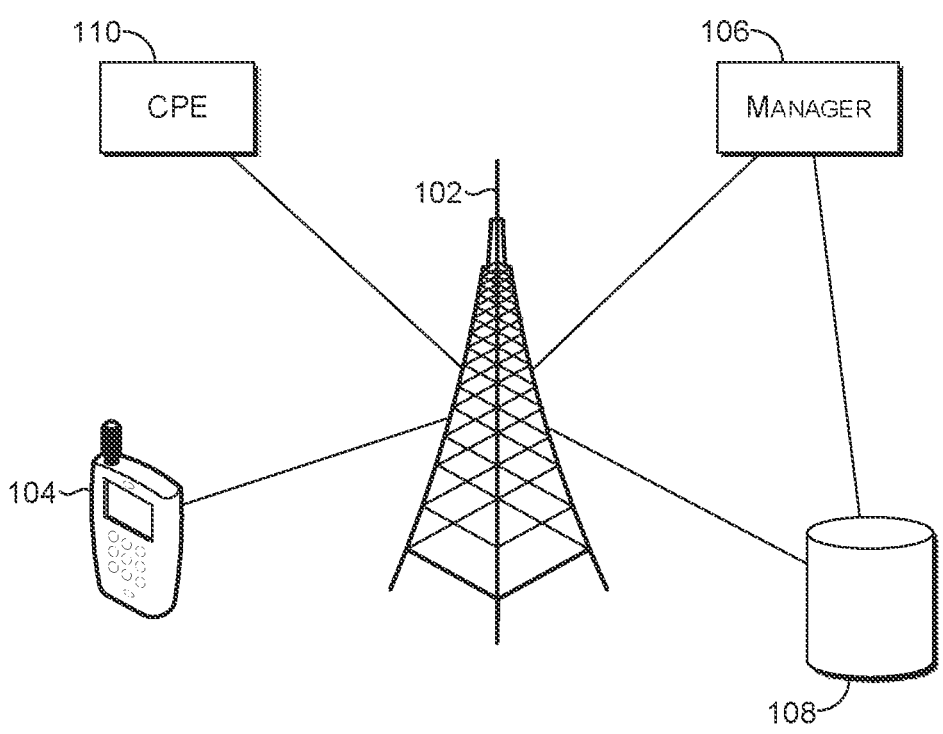
FIG. 1

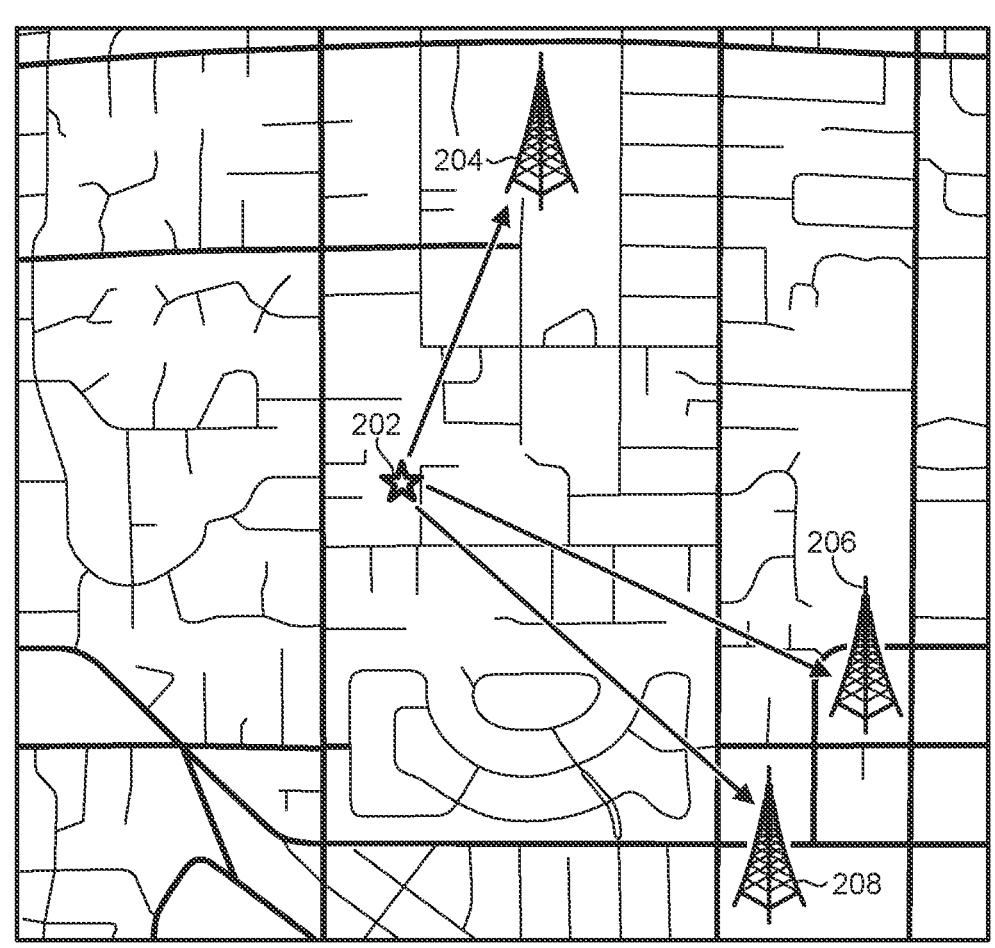
*FIG. 2*

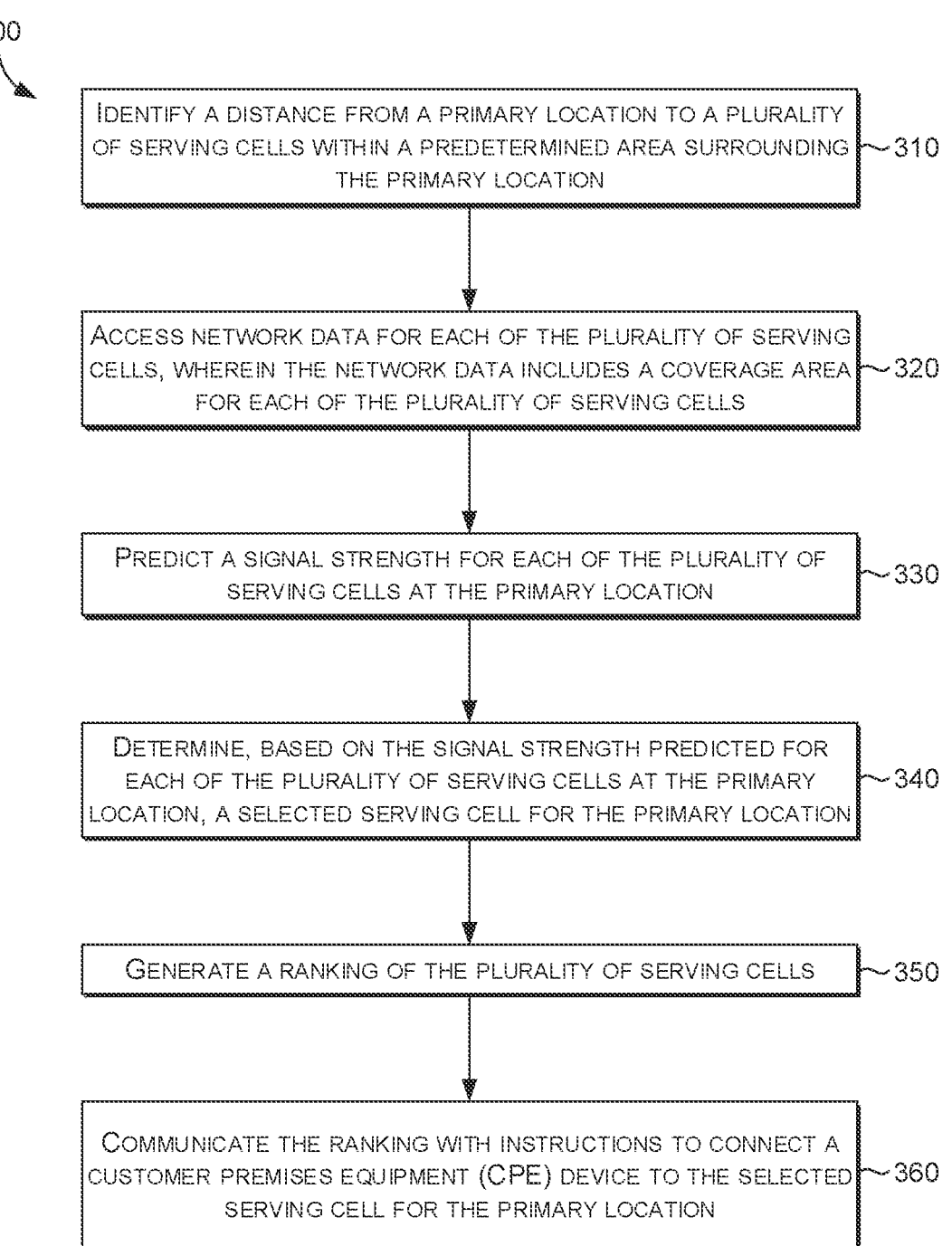

300

IDENTIFY A DISTANCE FROM A PRIMARY LOCATION TO A PLURALITY OF SERVING CELLS WITHIN A PREDETERMINED AREA SURROUNDING THE PRIMARY LOCATION ~310

ACCESS NETWORK DATA FOR EACH OF THE PLURALITY OF SERVING CELLS, WHEREIN THE NETWORK DATA INCLUDES A COVERAGE AREA FOR EACH OF THE PLURALITY OF SERVING CELLS ~320

PREDICT A SIGNAL STRENGTH FOR EACH OF THE PLURALITY OF SERVING CELLS AT THE PRIMARY LOCATION ~330

DETERMINE, BASED ON THE SIGNAL STRENGTH PREDICTED FOR EACH OF THE PLURALITY OF SERVING CELLS AT THE PRIMARY LOCATION, A SELECTED SERVING CELL FOR THE PRIMARY LOCATION ~340

GENERATE A RANKING OF THE PLURALITY OF SERVING CELLS ~350

COMMUNICATE THE RANKING WITH INSTRUCTIONS TO CONNECT A CUSTOMER PREMISES EQUIPMENT (CPE) DEVICE TO THE SELECTED SERVING CELL FOR THE PRIMARY LOCATION ~360

*FIG. 3*

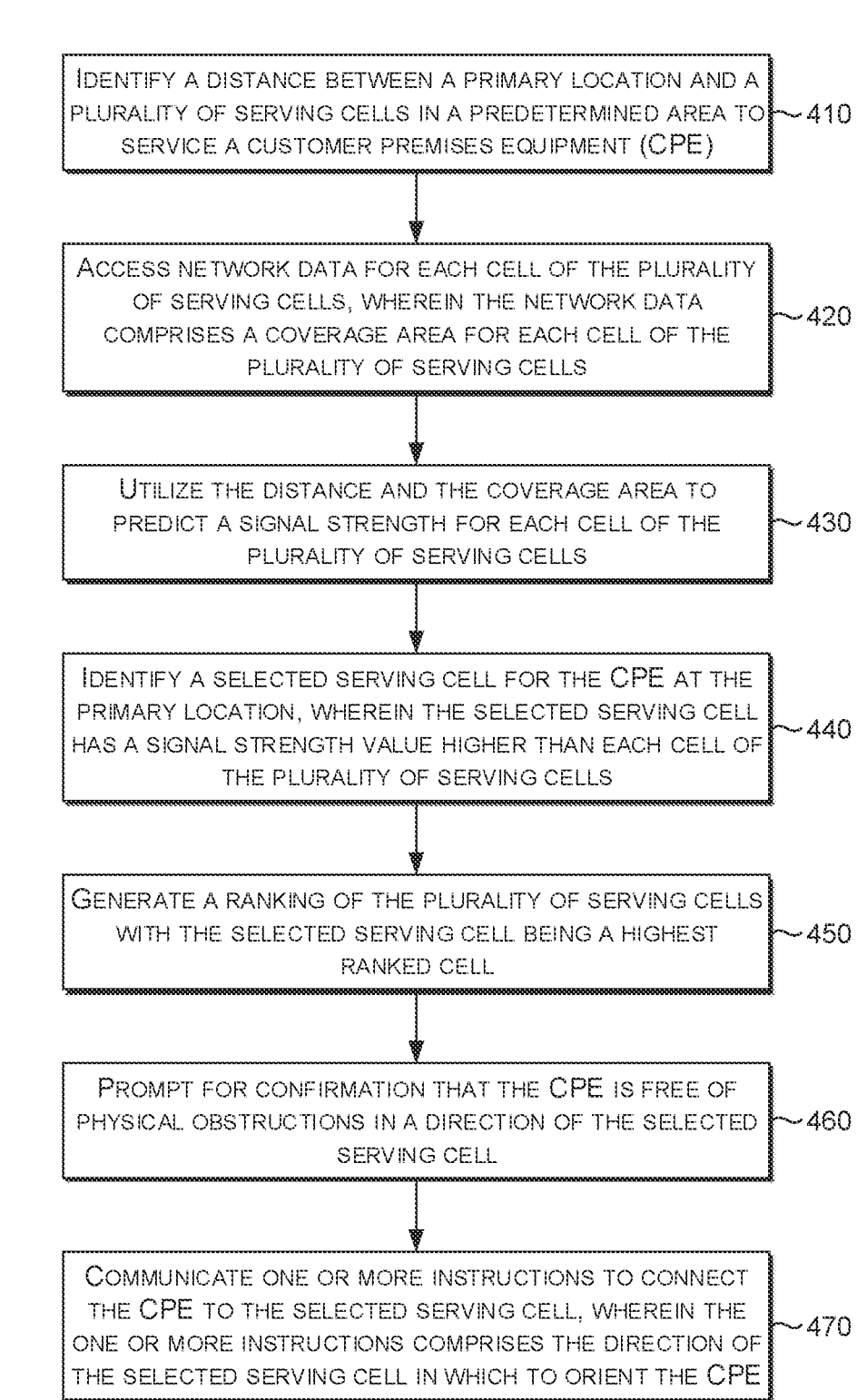

400

IDENTIFY A DISTANCE BETWEEN A PRIMARY LOCATION AND A PLURALITY OF SERVING CELLS IN A PREDETERMINED AREA TO SERVICE A CUSTOMER PREMISES EQUIPMENT (CPE) ~410

ACCESS NETWORK DATA FOR EACH CELL OF THE PLURALITY OF SERVING CELLS, WHEREIN THE NETWORK DATA COMPRISES A COVERAGE AREA FOR EACH CELL OF THE PLURALITY OF SERVING CELLS ~420

UTILIZE THE DISTANCE AND THE COVERAGE AREA TO PREDICT A SIGNAL STRENGTH FOR EACH CELL OF THE PLURALITY OF SERVING CELLS ~430

IDENTIFY A SELECTED SERVING CELL FOR THE CPE AT THE PRIMARY LOCATION, WHEREIN THE SELECTED SERVING CELL HAS A SIGNAL STRENGTH VALUE HIGHER THAN EACH CELL OF THE PLURALITY OF SERVING CELLS ~440

GENERATE A RANKING OF THE PLURALITY OF SERVING CELLS WITH THE SELECTED SERVING CELL BEING A HIGHEST RANKED CELL ~450

PROMPT FOR CONFIRMATION THAT THE CPE IS FREE OF PHYSICAL OBSTRUCTIONS IN A DIRECTION OF THE SELECTED SERVING CELL ~460

COMMUNICATE ONE OR MORE INSTRUCTIONS TO CONNECT THE CPE TO THE SELECTED SERVING CELL, WHEREIN THE ONE OR MORE INSTRUCTIONS COMPRISES THE DIRECTION OF THE SELECTED SERVING CELL IN WHICH TO ORIENT THE CPE ~470

*FIG. 4*

SERVING CELL PLANNING TOOL

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for serving cell planning. More particularly, in aspects set forth herein, systems and methods enable serving cell planning utilizing an installation tool that evaluates network parameters to identify a best serving cell for customer premises equipment (CPE) based on a location of the CPE relative to a plurality of serving cells.

BRIEF DESCRIPTION OF THE SEVERAL VIEWS OF THE DRAWINGS

Implementations of the present disclosure are described in detail below with reference to the attached drawing figures, wherein:

FIG. 1 depicts a diagram of an exemplary network environment in which implementations of the present disclosure may be employed, in accordance with aspects herein;

FIG. 2 depicts a diagram of an exemplary network environment in which implementations of the present disclosure may be employed, in accordance with aspects herein;

FIG. 3 depicts a flow diagram of a method for serving cell planning, in accordance with aspects herein;

FIG. 4 depicts a flow diagram of a method for serving cell planning, in accordance with aspects herein.

DETAILED DESCRIPTION

Figure 5:
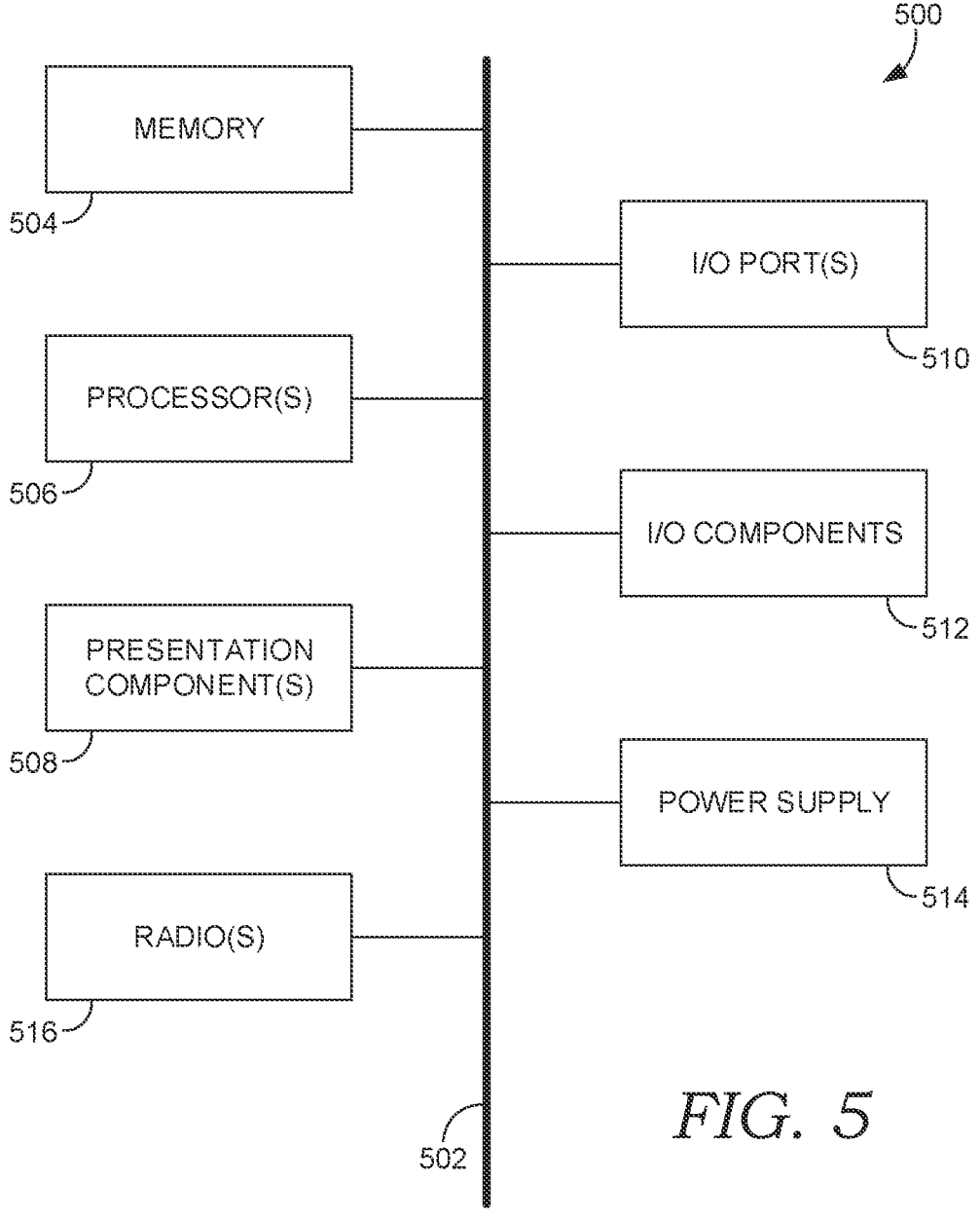
FIG. 5 depicts a diagram of an exemplary computing environment suitable for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System AMF Access & Mobility Management Function
APN Access Point Name
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCF Policy Control Function
PCS Personal Communications Service
PDA Personal Digital Assistant
RAM Random Access Memory
RET Remote Electrical Tilt
RF Radio-Frequency
RFI Radio-Frequency Interference
R/N Relay Node
ROM Read Only Memory
SINR Signal-to-Interference-Plus-Noise Ratio
SMF Session Management Function
SNR Signal-to-noise ratio
SON Self-Organizing Networks
TDMA Time Division Multiple Access
TXRU Transceiver (or Transceiver Unit)
UDM Unified Data Management Function
UDR Unified Data Repository
UE User Equipment
UPF User Plane Function Further, various technical terms are used throughout this description. An illustrative resource that fleshes out various aspects of these terms can be found in Newton's Telecom Dictionary, 32d Edition (2022).

As used herein, the term "node" is used to refer to network access technology for the provision of wireless telecommunication services from a base station to one or more electronic devices, such as an eNodeB, gNodeB, etc.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In conventional cellular communications technology, a 5G telecommunications network comprises a 5G Core Network (5GC) and a gNB. The 5GC architecture, as known to those in the art, relies on a Service-Based Architecture (SBA) framework where the architecture elements are defined in terms of Network Functions (NF) rather than by traditional network entities. Using interfaces of a common framework, any NF can offer its services to other NFs that are permitted to make use of their functions. At times, the network interfaces can experience complete failures, degradations, and the like. This compromises the ability of other NFs to obtain necessary data to establish reliable sessions for UEs.

The present disclosure is directed to serving cell planning. More particularly, in aspects set forth herein, systems and methods enable serving cell planning utilizing an installation tool that evaluates network parameters to identify a best serving cell for customer premises equipment (CPE) based on a location of the CPE relative to a plurality of serving cells.

Accordingly, a first aspect of the present disclosure is directed to a system for serving cell planning. The system comprises one or more processors and one or more computer-readable media storing computer-usable instructions that, when executed by the one or more processors, cause the one or more processors to: identify a distance from a primary location to a plurality of serving cells within a predetermined area surrounding the primary location; access network data for each of the plurality of serving cells, wherein the network data includes a coverage area for each of the plurality of serving cells; predict a signal strength for each of the plurality of serving cells at the primary location; determine, based on the signal strength predicted for each of the plurality of serving cells at the primary location, a selected serving cell for the primary location; generate a ranking of the plurality of serving cells; and communicate the ranked list with instructions to connect a customer premises equipment (CPE) device to the selected serving cell for the primary location, wherein the instructions include a direction to orient the CPE.

A second aspect of the present disclosure is directed to a method for serving cell planning. The method comprises identifying a distance from a primary location to a plurality of serving cells within a predetermined area surrounding the primary location; accessing network data for each of the plurality of serving cells, wherein the network data includes a coverage area for each of the plurality of serving cells; predicting a signal strength for each of the plurality of serving cells at the primary location; determining based on the signal strength predicted for each of the plurality of serving cells at the primary location, a selected serving cell for the primary location; generating a ranking of the plurality of serving cells; and communicating the ranked list with instructions to connect a customer premises equipment (CPE) device to the selected serving cell for the primary location, wherein the instructions include a direction to orient the CPE.

Another aspect of the present disclosure is directed to a system for serving cell planning. The system comprises one or more processors and one or more computer-readable media storing computer-usable instructions that, when executed by the one or more processors, cause the one or more processors to: identify a distance between a primary location and a plurality of serving cells in a predetermined area to service a customer premises equipment (CPE); access network data for each cell of the plurality of serving cells, wherein the network data comprises a coverage area for each cell of the plurality of serving cells; utilize the distance and the coverage area to predict a signal strength for each cell of the plurality of serving cells; identify a selected serving cell for the CPE at the primary location, wherein the selected serving cell has a signal strength value higher than each cell of the plurality of serving cells; generate a ranking of the plurality of serving cells with the selected serving cell being a highest ranked cell; prompt for confirmation that the CPE is free of physical obstructions in a direction of the selected serving cell; and communicate one or more instructions to connect the CPE to the selected serving cell, wherein the one or more instructions comprises the direction of the selected serving cell in which to orient the CPE.

As previously noted, aspects herein are provided for serving cell planning. More particularly, systems and methods enable serving cell planning by utilizing an installation tool that evaluates network parameters to identify a best serving cell for customer premises equipment (CPE) based on a location of the CPE relative to a plurality of serving cells.

Wireless high-speed internet (HSI) is becoming more popular as an alternative to traditional options due to convenience of installation, among other reasons. However, wireless HSI has some propagation challenges such as requiring a line-of-sight (LOS) with the serving cell as well as significant indoor penetration loss for radio signals operating at higher frequencies. Customer Premises Equipment (CPE) devices are developing that mitigate indoor propagation losses but, in order to be effective, it must be determined whether each application can maintain LOS with a serving cell. An installation tool that evaluates various network factors to advise on viability and installation of CPE and indicate an orientation to face the best serving cell is described herein.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

A network environment may comprise a base station 102 to facilitate wireless communication between a communications device within the network, such as communications device 500 described with respect to FIG. 5 and a network. As shown in FIG. 1, communications device may be UE 104, customer premises equipment (CPE) 110. In the network environment 100, UE 104 may communicate with other devices, such as mobile devices, servers, etc. The UE 104 may take on a variety of forms, such as a personal computer, a laptop computer, a tablet, a netbook, a mobile phone, a Smart phone, a personal digital assistant, customer premises equipment (CPE) or any other device capable of communicating with other devices. For example, the UE 104 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 104 comprises a wireless or mobile device with which a wireless telecommunication network(s) can be utilized for communication (e.g., voice and/or data communication). In this regard, the UE 104 can be any mobile computing device that communicates by way of, for example, a 5G network.

The UE 104 may utilize a network to communicate with other computing devices (e.g., mobile device(s), a server(s), a personal computer(s), etc.). In embodiments, the network is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. The network may include multiple networks. The network may be part of a telecommunications network that connects subscribers to their immediate service provider. In embodiments, the network is associated with a telecommunications provider that provides services to user devices, such as UE 104. For example, the network may provide voice services to user devices or corresponding users that are registered or subscribed to utilize the services provided by a telecommunications provider.

The base station 102 communicates with the UE 104 (as described above) and various other network components, such as a database 108 and a manager 106. The manager 106 can be located at the base station 102 or separate from the base station 102. The manager 106 can communicate with the base station 102, UE 104, and CPE 110. The manager 106 can be linked to an application running on either UE 102, CPE 110, or the like. The application can be an installation tool/application that evaluates various network parameters to identify a best serving cell for the CPE 110. A best serving cell, as used herein, refers generally to a serving cell that has a signal strength value that is higher than any other serving cell identified within a predetermined area relative to a CPE or UE. In other aspects, the best serving cell may be a serving cell that high a data throughput rate that is a higher value than any other serving cell identified within the predetermined area relative to the CPE or UE.

Initiation of the tool may be triggered by opening of the application, a request from a UE or CPE to begin installation of the CPE, or a command received to begin the installation evaluation. Once initiated, a distance from a primary location to a plurality of serving cells within a predetermined area relative to the primary location is determined. The primary location, as used herein, refers generally to a location in which the CPE to be configured is located. This location may be obtained by the network with its knowledge of a location of a CPE at any given time, a location of a UE registered to a same user as the user registered to the CPE, or a manually input user-provided address. This determination of distance is determined by the manager 106 on the network-side leveraging network data for each of the plurality of serving cells.

Additional network data that is accessible to the manager 106 includes a coverage area for each serving cell, signal strength data (received signal strength indicators—RSSI), data throughput data, signal-to-interference-plus-noise ratio (SINR) data, and the like. A coverage area, as used herein, refers generally to a footprint of a serving cell (i.e., an area served by a serving cell). Signal strength can also be identified for various points within a coverage area. For instance, the manager 106 can access a signal strength at a cell edge, at a location close to the cell, and the like.

Using the coverage area and known signal strengths within the coverage area for each serving cell, the signal strength at a primary location (of the CPE) can be predicted, along with an expected data throughput for the primary location. Signal strength and data throughput correlate with modulation levels and, as such, modulation levels for network cells can also be used to predict signal strength and/or data throughput for a particular location.

Once the signal strengths and/or data throughput for each cell within a predetermined area are identified or predicted, a ranking of the cells can be generated by the manager 106. The ranking can be a ranking list that sorts each network cell in the predetermined area relative to the CPE based on their signal strength, data throughput, etc., at the primary location. Thus, a cell with the highest signal strength value would be ranked highest as the first priority cell for servicing the CPE. The cell ranked highest is identified as the selected serving cell. The ranking or prioritization can be communicated to the UE 104 or the CPE 110 with instructions to connect to the selected serving cell. The instructions can include a direction in which the CPE 110 should face in order to be aligned with the selected serving cell (e.g., in order to face the same direction).

Additionally, the manager 106 can generate the ranking by considering any physical obstructions between the primary location and any of the serving cells within the predetermined area. Physical obstructions, as used herein, refers generally to any physical object that could diminish the signal such as buildings, walls, trees, etc. The manager 106 can identify any such physical obstructions by accessing topographical data, map/street view data, satellite views, user-provided data, and the like. For instance, a user could input into their user profile that their house has no windows on the south side of their home. If, for instance, a cell was identified as the selected serving cell for the user but it was in a southern direction from the user's home, the manager 106 may de-prioritize the selected serving cell since there is not a direct line-of-sight on the south side of the home.

FIG. 2 is an exemplary depiction of an environment 200 utilizing the intelligent installation tool. As shown, a primary location 202 is identified by one or more methods including a user-provided address, identifying a location of a CPE to be activated/installed, identifying a location of UE, and the like. Once the primary location 202 is identified, a predetermined area surrounding the primary location 202 is identified. As shown in FIG. 2, the predetermined area including three cells that could potentially service a CPE at the primary location 202. The potential cells include cell 204, cell 206, and cell 208. In aspects, the installation tool can identify a distance between the primary location and each of cells 204, 206, and 208. The installation tool can, as described above, also access a coverage area and corresponding signal strengths for each cell. This data can be utilized to predict a signal strength at the primary location 202 for each of the potential cells. A higher signal strength value is correlated with better service. Thus, the potential cell with a highest signal strength value is ranked highest on a ranking list. For example, assume that cell 204 has the highest predicted signal strength value (i.e., the signal strength value of cell 204 is higher than that of cell 206 and cell 208), then the cell 204 would be ranked as the first cell and identified as the selected serving cell. This ranking would be provided to the UE along with instructions on how to install the CPE, including which direction the CPE should be pointed (e.g., northeast).

If, however, the primary location 202 is identified as having a physical obstruction between the primary location 202 and the selected serving cell 204, the ranking list would be re-ranked. In other words, the cell 204 would be de-prioritized from the selected serving cell and other cells, such as cell 206 and cell 208 would be evaluated such that the cell with the second highest signal strength value is identified as the selected serving cell. As discussed above, physical obstructions can be identified by user-provided data, topographical data, map-street view data, satellite image data, and the like.

Identification of physical obstructions is discussed above as a means to re-prioritize a ranking list. However, identification of physical obstructions can happen prior to generation of the initial list such that the proposed selected serving cell would be eliminated from the selected serving cell position prior to being communicated to a UE. In some aspects, a user can be prompted, via a UE, to provide a confirmation that the proposed line-of-sight is free of physical obstructions between the primary location and a selected serving cell.

Turning to FIG. 3, a flow diagram 300 is provided illustrating a flow for serving cell planning. Initially, at block 310, a distance from a primary location to a plurality of serving cells within a predetermined area surrounding the primary location is identified. Network data for each of the plurality of serving cells is accessed at block 320. The network data comprises a coverage area for each of the plurality of serving cells. At block 330, a signal strength for each of the plurality of serving cells at the primary location is predicted. At block 340, based on the signal strength predicted for each of the plurality of serving cells at the primary location, a selected serving cell for the primary location is determined. A ranking of the plurality of serving cells is generated at block 350. The ranking is communicating with instructions to connect a customer premises equipment (CPE) device to the selected serving cell for the primary location at block 360. The instructions communicated to the CPE can include a direction in which to orient the CPE such that the CPE is facing the selected serving cell.

Referring to FIG. 4, a flow diagram 400 is provided illustrating a flow for serving cell planning. At block 410, a distance between a primary location and a plurality of serving cells in a predetermined area is identified to service a customer premises equipment (CPE). At block 420, network data is accessed for each cell of the plurality of serving cells. The network data can include a coverage area for each cell of the plurality of serving cells. At block 430, the distance and the coverage area are utilized to predict a signal strength for each cell of the plurality of serving cells. A selected serving cell for the CPE at the primary location is identified at block 440. The selected serving cell has a signal strength value higher than each cell of the plurality of serving cells. At block 450, a ranking of the plurality of serving cells is generated with the selected serving cell being a highest ranked cell. At block 460, a device is prompted for confirmation that the CPE is free of physical obstructions in a direction of the selected serving cell. At block 470, one or more instructions to connect the CPE to the selected serving cell is communicated. The one or more instructions can include the direction of the selected serving cell in which to orient the CPE such that the CPE is facing the same direction as the selected serving cell.

Referring to FIG. 5, a block diagram of an exemplary computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. It should be noted that although some components in FIG. 5 are shown in the singular, they may be plural. For example, the computing device 500 might include multiple processors or multiple radios. In aspects, the computing device 500 may be a UE/WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 510 that directly or indirectly couples various components together, including memory 512, processor(s) 514, presentation component(s) 516 (if applicable), radio(s) 524, input/output (I/O) port(s) 518, input/output (I/O) component(s) 520, and power supply(s) 522. Although the components of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database. A database may be any collection of records, data, and/or information. In one embodiment, memory 512 may include a set of embodied computer-executable instructions that, when executed, facilitate various functions or elements disclosed herein. These embodied instructions will variously be referred to as "instructions" or an "application" for short.

Processor 514 may actually be multiple processors that receive instructions and process them accordingly. Presentation component 516 may include a display, a speaker, and/or other components that may present information (e.g., a display, a screen, a lamp (LED), a graphical user interface (GUI), and/or even lighted keyboards) through visual, auditory, and/or other tactile cues.

Radio 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, 3G, 4G, LTE, mMIMO/5G, NR, VOLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports may include a USB jack, a stereo jack, an infrared port, a firewire port, other proprietary communications ports, and the like. Input/output (I/O) components 520 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 500 or to other network components, including through one or more electrical connections or couplings. Power supply 522 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for serving cell planning, the system comprising:

one or more processors; and one or more computer-readable media storing computer-usable instructions that, when executed by the one or more processors, cause the one or more processors to:

identify a distance from a primary location to a plurality of serving cells within a predetermined area surrounding the primary location;

access network data for each of the plurality of serving cells, wherein the network data includes a coverage area for each of the plurality of serving cells;

predict a signal strength for each of the plurality of serving cells at the primary location;

determine, based on the signal strength predicted for each of the plurality of serving cells at the primary location, a selected serving cell for the primary location;

generate a ranking of the plurality of serving cells; and communicate a ranked list with instructions to connect a customer premises equipment (CPE) device to the selected serving cell for the primary location, wherein the instructions include a direction to orient the CPE.

2. The system of claim 1, wherein the primary location is a user equipment (UE) location.

3. The system of claim 1, wherein the primary location is a user-provided address.

4. The system of claim 1, wherein the selected serving cell has a signal strength higher than each other serving cell of the plurality of serving cells.

5. The system of claim 1, wherein the one or more processors is further configured to prompt, via a user equipment (UE), to confirm there are no physical obstructions between the primary location and a direction of the selected serving cell.

6. The system of claim 1, wherein the one or more processors is further configured to access topographical data to identify any physical obstructions between the primary location and a direction of the selected serving cell.

7. The system of claim 6, wherein physical obstructions comprise one or more of a building, a tree, and a permanent fixture.

8. A method for serving cell planning, the method comprising:

identifying a distance from a primary location to a plurality of serving cells within a predetermined area surrounding the primary location;

accessing network data for each of the plurality of serving cells, wherein the network data includes a coverage area for each of the plurality of serving cells;

predicting a signal strength for each of the plurality of serving cells at the primary location;

determining based on the signal strength predicted for each of the plurality of serving cells at the primary location, a selected serving cell for the primary location;

generating a ranking of the plurality of serving cells; and communicating a ranked list with instructions to connect a customer premises equipment (CPE) device to the selected serving cell for the primary location, wherein the instructions include a direction to orient the CPE.

9. The method of claim 8, wherein the primary location is a user equipment (UE) location.

10. The method of claim 8, wherein the selected serving cell has a signal strength higher than each other serving cell of the plurality of serving cells.

11. The method of claim 8, wherein the method further comprises prompting, via a user equipment (UE), to confirm there are no physical obstructions between the primary location and a direction of the selected serving cell.

12. The method of claim 8, wherein the method further comprises accessing topographical data to identify any physical obstructions between the primary location and a direction of the selected serving cell.

13. A system for serving cell planning, the system comprising:

one or more processors; and one or more computer-readable media storing computer-usable instructions that, when executed by the one or more processors, cause the one or more processors to:

identify a distance between a primary location and a plurality of serving cells in a predetermined area to service a customer premises equipment (CPE);

access network data for each cell of the plurality of serving cells, wherein the network data comprises a coverage area for each cell of the plurality of serving cells;

utilize the distance and the coverage area to predict a signal strength for each cell of the plurality of serving cells;

identify a selected serving cell for the CPE at the primary location, wherein the selected serving cell has a signal strength value higher than each cell of the plurality of serving cells;

generate a ranking of the plurality of serving cells with the selected serving cell being a highest ranked cell;

prompt for confirmation that the CPE is free of physical obstructions in a direction of the selected serving cell; and communicate one or more instructions to connect the CPE to the selected serving cell, wherein the one or more instructions comprises the direction of the selected serving cell in which to orient the CPE.

14. The system of claim 13, wherein the primary location is a user equipment (UE) location.

15. The system of claim 13, wherein the primary location is a user-provided address.

16. The system of claim 13, wherein the selected serving cell has a data throughput value higher than each other serving cell of the plurality of serving cells.

17. The system of claim 13, wherein the one or more processors is further configured to receive a confirmation from a user equipment (UE) that the CPE is free of physical obstructions in the direction of the selected serving cell.

18. The system of claim 13, wherein the one or more processors is further configured to access topographical data to identify any physical obstructions between the primary location and a direction of the selected serving cell.

19. The system of claim 18, wherein physical obstructions comprise one or more of a building, a tree, and a permanent fixture.

20. The system of claim 13, wherein the one or more processors is further configured to: receive an indication that the CPE is not free of physical obstructions in a direction of the selected serving cell and re-prioritize the ranking such that a second-highest ranked serving cell is identified as an updated selected serving cell in the ranking.

* * * * *